R. M. SUTPHEN.
METHOD OF ILLUSTRATION.
APPLICATION FILED MAY 16, 1921.
1,407,498.
Patented Feb. 21, 1922.
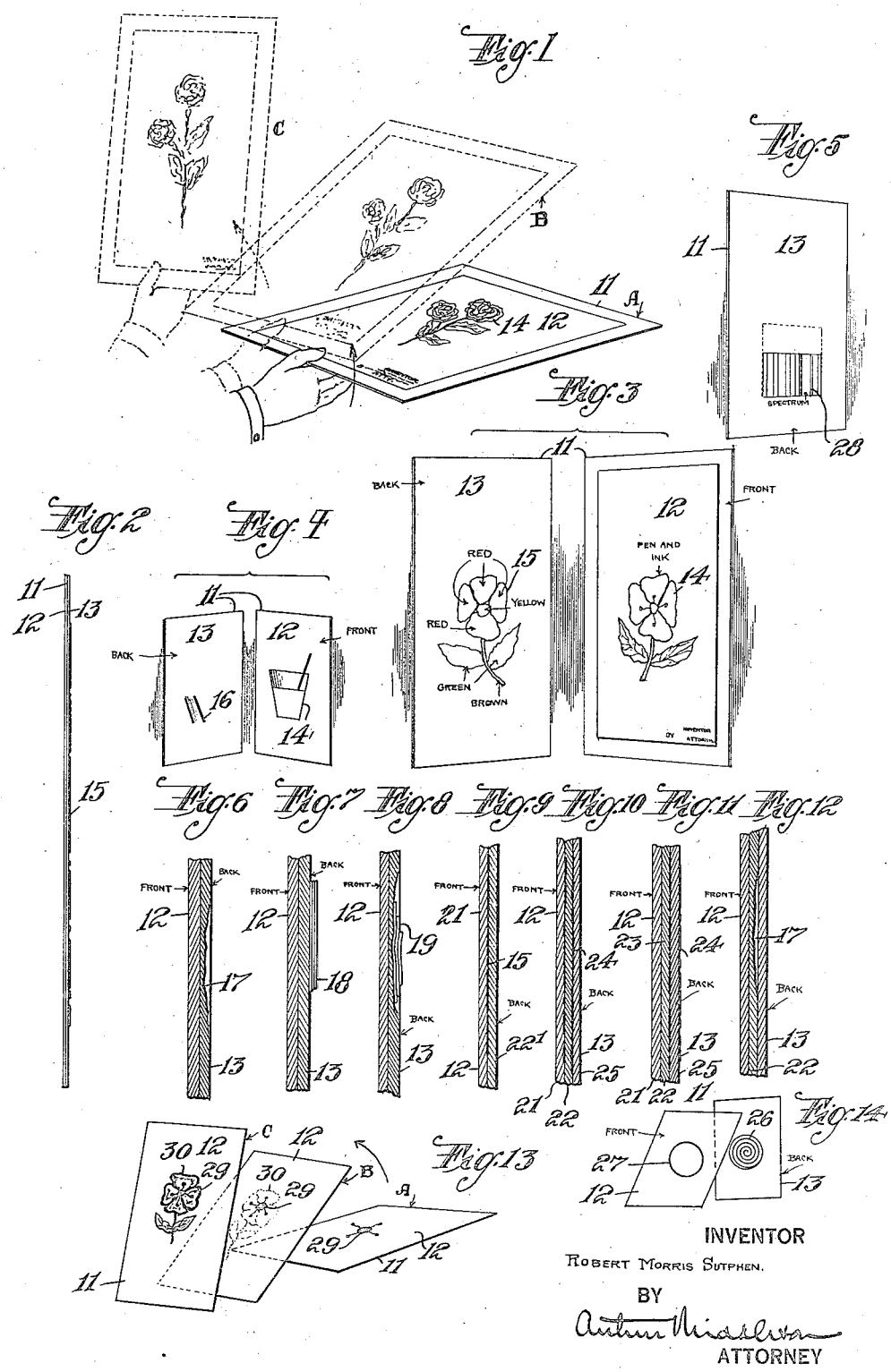
INVENTOR
ROBERT MORRIS SUTPHEN.
BY
ATTORNEY

UNITED STATES PATENT OFFICE.

ROBERT MORRIS SUTPHEN, OF NEWARK, NEW JERSEY, ASSIGNOR TO BI-VIEW, LIMITED, OF NEW YORK, N. Y., A LIMITED LIABILITY PARTNERSHIP OF NEW YORK.

METHOD OF ILLUSTRATION.

1,407,498.      Specification of Letters Patent.     Patented Feb. 21, 1922.

Application filed May 16, 1921. Serial No. 470,029.

*To all whom it may concern:*

Be it known that I, ROBERT MORRIS SUTPHEN, a citizen of the United States, residing at Newark, in the county of Essex and State of New Jersey, have invented certain new and useful Improvements in Methods of Illustration, of which the following is a specification.

This invention relates to the preparation of drawings of inventions and associated matters such as trade-marks and designs and its object is to illustrate them more clearly or in a more life-like manner than is at present the custom in official Patent Office drawings.

The invention consists essentially in using the customary bristol board sheets or other translucent material and applying to one side thereof a drawing of the invention in black ink which shows the usual views with all their detail and then applying to the side of the sheet additional views, preferably in color registering with the views on the front of the sheet whereby when the sheet is viewed by reflected light the usual drawing in black appears but when the sheet is viewed by transmitted light, the composite view appears. In other words one aspect of the invention is applied to one side of the sheet and another aspect of the invention is applied to the back of the sheet with the two views registering.

The invention is capable of many embodiments but only one or two are herein set forth and therefore they are to be taken as being illustrative and not as limited. With this in mind, the invention has been illustrated in the accompanying drawings in which—

Figure 1 shows perspectively the effect produced when viewing a drawing made according to this invention;

Figure 2 shows a side elevation of a sheet made according to this invention;

Figure 3 shows the front and back of such a sheet, as also does Figure 4;

Figure 5 shows how spectrum lines may be used;

Figures 6 to 12 show partial vertical sections of sheets embodying modifications of the invention;

Fig. 13 shows how the effect of whole composition grows as the position of the sheet is changed, and Fig. 14 shows how the illusion of motion can be produced by means of this invention.

In the embodiments of the invention shown, the translucent sheet 11 has a front face 12 and a back 13. On the front face 12 is applied a drawing 14 prepared as is usual in black ink. On the back of the sheet and in register with the black ink view 14 I show another aspect of the invention 15, preferably in color so that the front face of the drawing shows the black ink aspect while the back of the sheet shows the color as illustrated in Figure 3. Instead of color on the back sheet, the second aspect which may be in black and this second aspect is indicated at 16 on the back of the sheet in Figure 4.

The second aspect in this case is the appearance of liquid and the refraction of the rod is on the back so that when the sheet is viewed by transmitted light a complete picture is seen. The same is true of the drawing in Figure 3. When the sheet is placed on a table or other support face up, only the black ink drawing 14 is seen, but as the sheet is raised as shown in Figure 1 from the position on the table A in Figure 1, through the positions B to C and therefore the change from viewing the drawing by reflected light in the position A to viewing it by transmitted light, changes the picture from a simple black drawing to a composite drawing of the black drawing on the face and the colored or other aspect on the back of the sheet which is in register with that on the front.

Figure 2 shows diagrammatically, a sheet to which the coloring 15 is applied to the back. Effects of illumination or electric discharges can be produced by removing a part of the back of the sheet as at 17. Several colors can be superposed upon the back of the sheet as at 18 and a combination of removing a part of the sheet and superposed colors is shown at 19. Further, the colors or second aspect of the invention 15 can be placed between two plys of paper 21 and 22' or one part 23 of the coloring can be placed between two plys 21 and 22 of a sheet and another part 24 of the color can be placed between the second ply 22 and the third ply 25. On the other hand, one part of the color can be placed between the second plys 22 and 25 of the coloring sheet and second part 24 of the coloring can be applied to the back of the third ply. In the same way, the removed portion 17 can be on a middle ply 22.

The illusion of rotation can be produced by putting a spiral 26 or a plurality of curved lines on the back of a sheet in register with the black ink drawing 27 on the front of the sheet which it is desired to have appear to rotate. That is, a construction of this character appears to rotate when the drawing is viewed by transmitted light and a light rotary motion is imparted to the sheet. Effervescence may be shown by making pin or other pricks through the sheet or by applying small circles on the back of the sheet.

The chemical action can be shown taking place in an apparatus by means of various colors applied to the back of the sheet and the chemical form can be indicated by using its spectrum color or lines as shown at 28 in Figure 5. By the proper positioning of the spectrum lines either to the right or left, the chemical may be shown to be advancing or retreating.

In Fig. 13 is illustrated how one part of a view can be shown at 29 when the sheet is viewed by reflected light in the position A, and that as the sheet is moved through the position B to C where it is seen entirely by transmitted light. Another part of a view comes into prominence gradually until in the position C, the composite view is seen made up of the two parts 29 and 30.

It can thus be seen that by the use of this process, drawings can be made to show many things and actions which have hitherto been considered difficult, if not impossible to illustrate. For instance, Patent Office drawings of trade-marks can by the use of transmitted light, show the trade-mark in its characteristic colorings. In the same way, drawings of designs, such as rugs, textiles, china ware, etc., can be made to show the actual coloring of the design or pattern.

In patent drawings, covering woven or knitted fabrics, the individual threads can be easily followed by having a separate color applied to each. In complicated mechanical cases having many views, each train of associated elements can be given the same color in each view to make much easier the following of the drawing. In electrical cases, sparks, arcs or any other lighting effect can be shown by removing a part of the sheet from the back so that more transmitted light will pass through the sheet in the thinned area. In chemical cases, the chemical change can be shown, by means of color on the back at the point in the apparatus where it takes place and the chemical formed can be indicated by the use on the back by its spectrum color. Effervescence can be shown either by the use of tiny circles on the back of the sheet or by pin or other pricks through the sheet.

Moreover, phantom views may be obtained by showing an interior construction on one side of the sheet and the casing or other enclosing construction on the other side of the sheet in proper register. Again, a cross sectional or face view of an element can be shown on one side of the sheet and a prospective or length (or width) view of that element shown on the other side of the sheet and in register. Further, a part or element may be made to appear to rotate by placing on the back of the sheet and in register therewith, a spiral, or intersecting spirals, whereby when the sheet is moved slightly the illusion is produced of rotation of the element.

The invention has been primarily devised for the production of drawings for the Patent Office, but it is capable of being used to make illustrations of many kinds of inventions or other things for catalogue work, advertisement instruction, education and the like and the claims should be read in the light of this use.

I am aware that it has been previously proposed to put a picture or view on one side of a sheet with a color therefor on another side of the sheet but they have been used for amusement purposes whereas I consider my invention the specific utilitarian adaptation herein set forth with the addition thereto of the many features never heretofore revealed.

What I claim is:

1. A method of preparing illustrations of inventions which consists in showing one aspect of the invention on one side of a translucent sheet and another aspect thereof on the other side of the sheet, the two aspects forming a composite view when held to the light.

2. A method of preparing illustrations of inventions which consists in showing one aspect of the invention on one side of a translucent sheet and another aspect thereof on the other side of the sheet, the two aspects registering with each other and forming a composite view when held to the light.

3. The method of claim 2 in which one of said aspects is colored.

4. The method of preparing illustrations of inventions which consist in showing the apparatus thereof on one side of a translucent sheet and showing on the other side of the sheet changes taking place in the apparatus, said showings being complementary.

5. The method of claim 4 with the addition of showing the changes by the use of color.

6. The method of claim 4 with the addition of showing chemical changes in the apparatus on said opposite side of the sheet.

7. The method of claim 4 with the addition of showing chemical changes in the apparatus on said opposite side of the sheet, the chemical formed being shown by the spectrum color thereof.

8. The method of claim 4 with the addition of showing effervescence within the apparatus.

9. The method of claim 4 with the addition of showing effervescence within the apparatus by means of pricking the sheet.

10. The method of claim 4 with the addition of showing vapor in connection with the apparatus by the use of color.

11. A method of preparing illustrations of inventions which consists in producing a phantom view thereof with one part on one side of a translucent sheet and another part on the other side of the sheet, the two parts being complementary and forming a composite view when held to the light.

12. A drawing of an invention comprising a translucent sheet having one aspect of the invention on one side thereof, and another aspect of the invention on the other side thereof, the two aspects forming a composite view when held to the light.

13. The drawing of claim 12 in which the two aspects register with each other.

14. The drawing of claim 12 in which one of the aspects is colored.

15. A drawing of an invention comprising a translucent sheet showing one view of the invention when viewed by reflected light and a composite view of the invention when viewed by transmitted light, said views being complementary.

16. A drawing of an invention comprising a translucent sheet showing on one side thereof apparatus by which the invention may be carried out and showing on the other side of the sheet the changes which take place in the apparatus, the views on the two sides being complementary.

17. The drawing of claim 16 with the addition of a showing of chemical changes which take place in the apparatus.

18. The drawing of claim 16 with the addition of a colored showing of chemical action taking place in the apparatus.

19. The drawing of claim 16 with the addition of a colored showing of chemical change within the apparatus, the color of the chemical produced by the change being shown by spectrum color.

20. The drawing of claim 16 with the addition of means showing effervescence within the apparatus.

21. The drawing of claim 16 with the addition of pricks showing effervescence within the apparatus.

22. A drawing of an invention comprising a translucent sheet showing a phantom view of the invention, a part of which is on one side of the sheet and a part of which is on the other, the two parts being complementary and forming a composite view when held to the light.

23. The drawing of claim 22 in which one of said parts is colored.

24. A drawing of an invention comprising a translucent sheet having on one side thereof a cross-sectional view of the invention and on the opposite side of the sheet a perspective view of the invention registering with said cross sectional view.

25. A drawing of an invention comprising a translucent sheet having on one side thereof a showing of the invention in one plane and on the opposite side of the sheet a showing of the invention in another plane, the two showings forming a composite view when held to the light.

26. The drawing of claim 25 in which one view shows one dimension and the other view shows another dimension.

27. A drawing of an invention comprising a translucent sheet having on one side thereof a view of an apparatus adapted to produce a lighting effect, and means on the other side of the sheet for indicating said effect when viewed by transmitted light, said lighting effect being complementary to said view.

28. The drawing of claim 27 in which electrical lighting effect is indicated.

29. The drawing of claim 27 in which the means constitute removing part of the sheet.

30. The drawing of claim 27 in which the means constitute the removing of a part of the sheet for an area to indicate the extent of the light.

31. A drawing of an invention comprising a translucent sheet having one aspect of the invention on the face of said sheet, a colored aspect of the invention on the back of said sheet, the two aspects forming a composite view when held to the light, and a backing sheet of translucent material applied to the back of the first mentioned sheet to protect the color thereon.

In testimony whereof I affix my signature.

ROBERT MORRIS SUTPHEN.